United States Patent [19]

Neese et al.

[11] Patent Number: 4,657,423

[45] Date of Patent: Apr. 14, 1987

[54] FASTENER AND RECEPTACLE ARRANGEMENT FOR PERPENDICULARLY CONNECTING PIECES OF FLAT STOCK MATERIAL

[75] Inventors: Wayne E. Neese, Hoffman Estates; Charles K. Kubik, Brookfield, both of Ill.

[73] Assignee: GTE Communications Systems Corp., Northlake, Ill.

[21] Appl. No.: 814,466

[22] Filed: Dec. 30, 1985

[51] Int. Cl.⁴ .............................................. F16B 9/00
[52] U.S. Cl. .................................... 403/21; 403/258; 403/406.1; 403/407.1; 411/103; 411/166; 411/176; 411/970; 52/582
[58] Field of Search ............... 403/21, 22, 258, 260, 403/406.1, 407.1, 405.1; 411/119, 120, 121, 122, 103, 104, 143, 146, 166, 176, 970; 52/582, 584

[56] References Cited

U.S. PATENT DOCUMENTS

| | | | |
|---|---|---|---|
| 2,487,731 | 11/1949 | Rosing | 403/361 X |
| 2,596,056 | 5/1952 | Tinnerman | 403/21 |
| 2,737,269 | 3/1956 | Flora | 403/21 |
| 3,106,994 | 10/1963 | Scott | 403/258 X |
| 3,110,372 | 11/1963 | Pierce et al. | 403/21 |
| 3,192,981 | 7/1965 | Oliver | 411/104 |
| 3,279,518 | 10/1966 | Bollinger | 411/166 |
| 3,754,677 | 8/1973 | Hug | 411/119 |
| 3,967,432 | 7/1976 | Starr | 411/103 X |
| 3,986,544 | 10/1976 | Jones et al. | 411/103 |
| 4,188,148 | 2/1980 | Waibel | 403/258 |

Primary Examiner—Cornelius J. Husar
Assistant Examiner—Todd G. Williams
Attorney, Agent, or Firm—Robert J. Black

[57] ABSTRACT

A fastener and receptacle arrangement is utilized to perpendicularly connect two pieces of flat stock material together. One piece of flat stock material includes a hole for insertion of the fastener and the other piece includes an opening for mounting a receptacle. The receptacle is secured to that board by a flexible member of the board which engages a recess in the receptacle. The piece of flat stock material with the receptacle secured to it is then perpendicularly secured to the other piece of flat stock material by a fastener which passes through that other piece of flat stock material and fixably engages the receptacle.

10 Claims, 7 Drawing Figures

FASTENER AND RECEPTACLE ARRANGEMENT FOR PERPENDICULARLY CONNECTING PIECES OF FLAT STOCK MATERIAL

FIELD OF THE INVENTION

The present invention relates to fastening devices and more particularly to an arrangement for perpendicularly connecting two or more pieces of flat stock material together by a fastener and receptacle arrangement.

BACKGROUND OF THE INVENTION

The assembly of sheet stock, whether metal, plastic or some other material, into various structures such as boxes, cages, covers, etc. requires some method of fastening those elements together in order to form those structures. Typical fastening methods include the use of flanges, connected by rivets or screws, standoffs, and tapped elements welded or riveted to flat areas of the assembly components. However, the use of flanges requires an unnecessary waste of space. An example of such wasted space occurs when a flange is mounted to a circuit board thereby eliminating use of the underlying printed circuit board area. Such flanges are typically mounted to a printed circuit board in order to mount a radio frequency shield to that board via the flange. Standoffs and tapped elements, welded to the assemblies, are also expensive and create an awkward assembly package. Plastic parts, tapped or drilled for self tapping screws, have also been used.

Alternative fastening methods include the use of circular plastic parts, tapped or drilled for self tapping screws. These parts have a spring-like section on their circumference which is deflected when they are pressed into an opening in an assembly panel. When so pressed a sufficient distance into such an opening the spring-like section is released and returns to its normal position, thereby locking the part in place. However, these parts, which are expensive, are subject to cold flow distortion do not conduct current and tend to become loose over a period of years.

Another fastening method is described in U.S. Pat. No. 3,967,432 which was issued to V. B. Starr on July 6, 1976. However, the fastener disclosed in that patent was of a complex design.

SUMMARY OF THE INVENTION

In accordance with the present invention a fastener and receptacle arrangement is provided for connecting panels together. The arrangement includes a first panel having a first open area located adjacent to one edge of the first panel, a second open area located adjacent to and wider than the first open area and a tongue located adjacent to the second open area. The tongue is operated to pivot away from and into the second open area.

This arrangement also includes a second panel having a third open area, a receptacle having a bore extending internal to and a slot formed across the receptacle, and a fastener. The receptacle is inserted into the second open area when the tongue is pivoted away from the second open area, and the receptacle is secured within the second open area when the tongue is pivoted into the second open area and engaged with the slot. The fastener is inserted into the second panel and it extends through the third and second open areas and engages with the receptacle by being inserted into the bore, thereby connecting the first panel to the second panel.

DESCRIPTION OF THE PREFERRED EMBODIMENT

The fastener and receptacle arrangement of the present invention provides a means for perpendicularly connecting pieces of flat sheet stock material to each other without the use of flanges, standoffs or other equivalent devices. The arrangement of the present invention provides for removal of a portion of one piece of flat sheet stock material to form an opening for securing a receptacle to that component. This receptacle can be round, square or some other shape. It also includes a cylindrical bore for receipt of a fastener. The cylindrical bore can subsequently be tapped for receipt of a threaded fastener or it can be utilized in connection with a self tapping fastener. A section of the piece of flat sheet stock material is also cut in such a manner as to provide a flexible member or tongue which can be moved about an uncut edge which operates as a hinge.

The receptacle also includes a slot for engagement with the flexible member. The receptacle is then secured to the piece of flat sheet stock material with the opening by first inserting it into that opening. It is then secured within the opening by the flexible member which engages the slot of the receptacle. Thus, the receptacle is prevented from turning when a fastener is engaged with it. The piece of flat sheet stock material with the secured receptacle is then perpendicularly connected to another piece of flat sheet stock material by a fastener which passes through a hole in that other piece and engages with the receptacle. By tightening the fastener within the receptacle the two pieces of flat sheet stock material are secured to each other in perpendicular planes.

Typical uses for such a fastening arrangement include the mounting of one flat panel to another, e.g., mounting a radio frequency shield to a printed circuit board. Other applications involve mounting a cover to a box of a "U" shaped member to a flat member.

Figure 1:
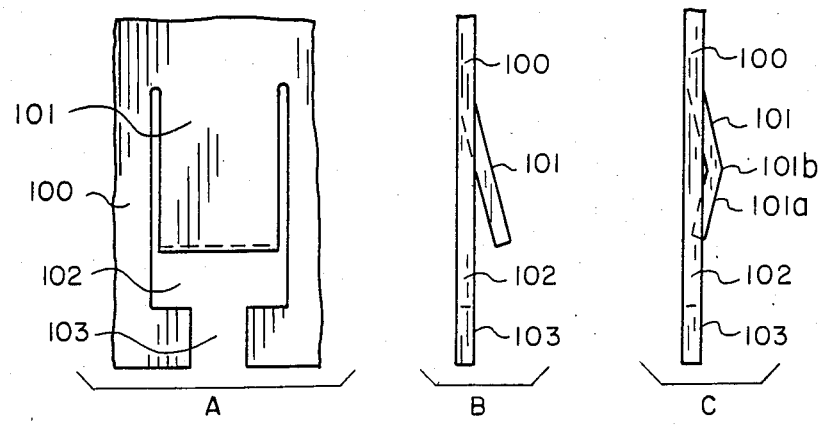
FIG. 1 of the accompanying drawing includes a front view of sheet stock material including an opening for a receptacle in accordance with the present invention. This Figure also includes two side views of alternative arrangements of the sheet stock material of FIG. 1.

Referring now to FIG. 1, View A, a front view of a portion of flat panel 100 is shown. This panel includes flexible member 101 which is cut from panel 100 on three sides, leaving it connected to the remainder of panel 100 by a fourth side. Thus, flexible member or tongue 101 can be deflected away from panel 100. Panel 100 also includes an opening 102 which has been cut out of panel 100 for insertion of a receptacle. Similarly, this panel includes passage 103 which has also been cut out of panel 100 for insertion of a fastener.

Referring now to View B, a side view of the panel of View A is shown. This side view shows panel 100 with flexible member or tongue 101 deflected away from panel 110. Also shown are receptacle opening 102 and fastener opening 103.

Referring now to View C an alternative embodiment of the flexible member or tongue of View A is shown. This embodiment includes panel 100 with flexible member 101 rotated away from that panel. However, this flexible member or tongue has additionally been flexed at point 101b, thereby providing an additional flexible member 101a. Also shown in this view is receptacle opening 102 and fastener opening 103.

Figure 2:
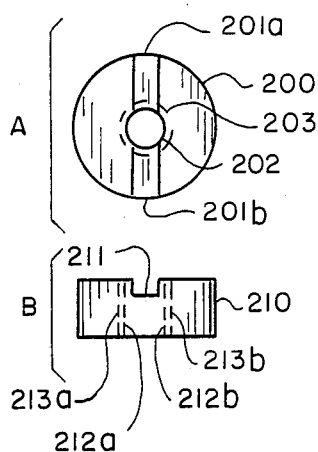
FIG. 2 of the accompanying drawing includes top and front views of a receptacle in accordance with the present invention.

Referring now to FIG. 2 a top view of a receptacle in accordance with the present invention is shown in View A and a front view of that receptacle is shown in View B. A receptacle 200 is shown with a slot cut across its top as indicated by 201a and 201b. This receptacle has a first inside diameter as indicated by 202 and a second inside diameter as indicated by 203. Two such inside diameters are shown to represent the threads that may be formed in the receptacle if it functions as a threaded nut.

In view B receptacle 210 is shown with slot 211 cut across its top and a first inside diameter indicated by 212a–b and a second inside diameter indicated by 213a–b. These inside and outside diameter indicators also represent the threads that may be formed in receptacle 210 if it functions as a threaded nut.

Figure 3:
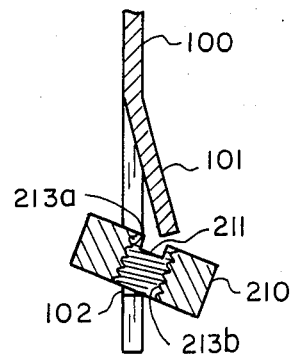
FIG. 3 is a cross sectional view of the sheet stock material of FIG. 1 and the partially positioned receptacle of FIG. 2 in accordance with the present invention.

Referring now to FIG. 3 receptacle 210 is shown partially inserted into panel 100 with flexible member or tongue 101 partially rotated away from panel 100 in order to allow fastener 210 to be inserted into receptacle opening 102. Threads 213a and b are shown in this cross sectional view of receptacle 210.

Figure 4:
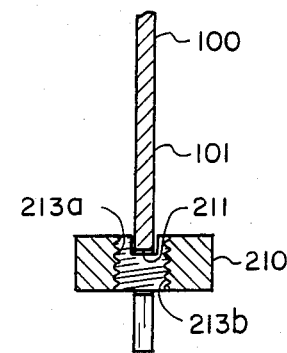
FIG. 4 is a cross sectional view of the sheet stock material of FIG. 1 and the finally positioned receptacle of FIG. 2 in accordance with the present invention.

Referring now to FIG. 4 a cross sectional view of panel 100 is shown with receptacle 210 inserted into panel 100 with flexible member of tongue 101 engaged in slot 211 of the receptacle. Thus receptacle 210 is secured to panel 100. Also shown are screw threads 213a and b formed around the inside diameter of receptacle 210.

Figure 5:
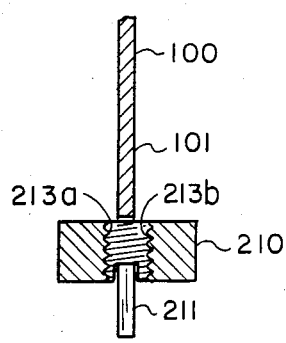
FIG. 5 is a cross sectional view of a second embodiment of the sheet stock material of FIG. 1 and the finally positioned receptacle of FIG. 2 in accordance with the invention.

Referring now to FIG. 5 a cross sectional view of panel 100 is shown with receptacle 510 inserted in such a manner as to cause slot 211 to be engaged with the lower edges of the receptacle opening formed in panel 100. Flexible member or tongue 101 is shown positioned within the plane of panel 100 to secure receptacle 210 within the receptacle opening. Threads 213a and b are also shown formed around the inside diameter of receptacle 210.

Figure 6:
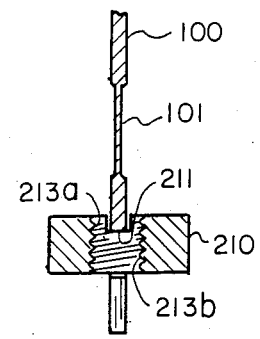
FIG. 6 is a cross sectional view of a third embodiment of the sheet stock material of FIG. 1 and the finally positioned receptacle of FIG. 2 in accordance with the present invention.

Referring now to FIG. 6 a cross sectional view of panel 100 is shown with receptacle 210 inserted within the receptacle opening formed with panel 100. However, flexible member or tongue 101 has been swaged, as indicated by 101, rather than cut to cause it to extend into the receptacle opening and thereby engage slot 211 of receptacle 210 to secure receptacle 210 within the receptacle opening. Screw threads 213a and b are also shown formed within the inner diameter of receptacle 210.

Figure 7:
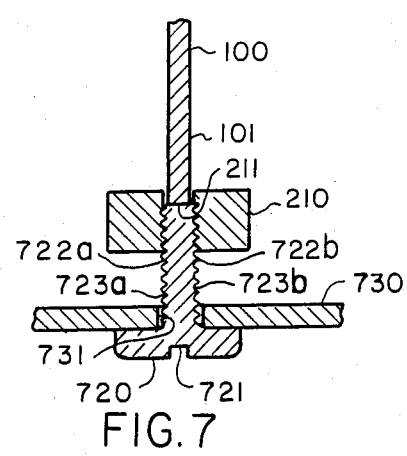
FIG. 7 is a cross sectional view of the sheet stock material of FIG. 1, the finally positioned receptacle of FIG. 2 and a fastener passing through a second piece of sheet stock.

Referring now to FIG. 7 a cross sectional view of panel 100 is shown with receptacle 210 secured within the receptacle opening of panel 100 by engagement of flexible member or tongue 101 with slot 211. This panel and receptacle assembly is further shown secured to supporting panel 730 by threaded fastener 720 which is inserted through a hole 731 in supporting panel 730. Fastener 720, which is typically a threaded screw, is then engaged with receptacle 710 by engagement of screw threads 712a–b and 723a–b with the threads of receptacle 210.

Thus, the fastener and receptacle arrangement of the present invention discloses a novel arrangement for perpendicularly securing a panel member to a supporting member through use of a receptacle or nut which is inserted into a receptacle opening formed within the panel member. The receptacle is then secured to the panel member by means of a flexible member or tongue. The combination panel and receptacle nut is then secured to the supporting panel by means of a fastener or screw which is inserted through a hole in the supporting panel. The fastener or screw then causes the panel and receptacle or nut combination to be secured to the supporting panel by engagement of the fastener with the receptacle. If a screw fastener and nut receptacle are used then the panel and nut combination is secured to the supporting panel by engagement of the threads of the screw fastener with the threads of the nut receptacle.

It will be obvious to those skilled in the art that numerous modifications of the present invention can be made without departing from the spirit of the invention which shall be limited only by the scope of the claims appended hereto.

What is claimed is:

1. A fastener and receptacle arrangement for connecting panels together, said arrangement comprising:

a first panel having a first open area located adjacent to one edge of the first panel, a second open area located adjacent to and wider than said first open area, and a tongue located adjacent to said second open area, said tongue being operated to pivot away from and subsequently into said second open area;

a second panel having a first open area;

a receptacle having a bore internal thereto and a slot formed across said receptacle;

a threaded fastener;

said receptacle being inserted into said second open area when said tongue is pivoted away from said second open area, and said receptacle being secured within said second open area when said tongue is subsequently pivoted into said second open area and engaged with said slot;

said fastener being inserted through said second panel and extending through said first panel first and second open areas and engaged with said receptacle by being inserted into said bore, whereby said first panel is connected to said second panel.

2. A fastener and receptacle arrangement as claimed in claim 1, wherein said tongue is rectangular.

3. A fastener and receptacle arrangement as claimed in claim 1, wherein said first panel first open area is rectangular.

4. A fastener and receptacle arrangement as claimed in claim 1, wherein said first panel second open area is rectangular.

5. A fastener and receptacle arrangement as claimed in claim 1, wherein said second panel first open area is circular.

6. A fastener and receptacle arrangement as claimed in claim 1, wherein said tongue includes a flexible joint, said tongue being further operated to pivot about said flexible pivot.

7. A fastener and receptacle arrangement as claimed in claim 1, wherein said bore extends through said receptacle.

8. A fastener and receptacle arrangement as claimed in claim 1, wherein said bore is threaded.

9. A fastener and receptacle arrangement as claimed in claim 1, wherein said receptacle is inserted into said first panel second open area such that said slot engages portions of the first panel that extend from the edges defining the width of said first panel first open area to the edges defining the width of said first panel second open area.

10. A fastener and receptacle arrangement as claimed in claim 1, wherein said tongue is elongated by swaging a portion thereof.

* * * * *